United States Patent [19]
Devimeux et al.

[11] Patent Number: 5,422,964
[45] Date of Patent: Jun. 6, 1995

[54] METHOD AND DEVICE FOR SPATIAL FILTERING OF DIGITAL IMAGES DECODED BY TRANSFORMATION OF BLOCK

[75] Inventors: Daniel Devimeux, Perros-Guirec; Jean-Claude Jolivet, St-Michael En Greve, both of France

[73] Assignee: SAT (Société Anonyme de Telecommunications), Paris, France

[21] Appl. No.: 45,666

[22] Filed: Apr. 9, 1993

[30] Foreign Application Priority Data

Apr. 17, 1992 [FR] France ................................. 92 04816

[51] Int. Cl.$^6$ .............................................. G06K 9/40
[52] U.S. Cl. ................................... 382/226; 382/232; 358/433; 358/461; 358/463
[58] Field of Search .................... 382/54, 56, 1, 6; 348/470, 576, 627, 671, 674, 688; 358/433, 455, 463, 461

[56] References Cited

U.S. PATENT DOCUMENTS

| | | | |
|---|---|---|---|
| 4,553,165 | 11/1985 | Bayer | 358/463 |
| 5,065,444 | 11/1991 | Garber | 382/54 |
| 5,220,616 | 6/1993 | Downing et al. | 382/54 |
| 5,235,434 | 8/1993 | Wober | 382/54 |

Primary Examiner—Leo H. Boudreau
Assistant Examiner—D. Rick Anderson
Attorney, Agent, or Firm—Laubscher & Laubscher

[57] ABSTRACT

Coding and decoding of digital images by transformation of pixel blocks reduce the data bit rate. Transformation of blocks leads to discontinuities in brightness level for pixels bordering on block boundaries. These discontinuities are detected for each given bordering pixel by a change of sign of two level gradients respectively computed with the levels of two pixels adjacent to the bordering pixel. A brightness level of the bordering pixel is then corrected by a discontinuity correction factor evaluated from a discontinuity divergence equal to the absolute value of the difference between the brightness level of the bordering pixel and an arithmetical average of brightness levels of the two adjacent pixels, as a function of a quantization pitch associated with a block to which belongs the bordering pixel. The block is then corrected in its entirety to attenuate the differences of average brightness levels between two adjacent blocks generated by the coding and decoding.

8 Claims, 5 Drawing Sheets

IMAGE TO BE TRANSMITTED

CODING + TRANSMISSION + DECODING

RECONSTITUTED IMAGE

METHOD AND DEVICE FOR SPATIAL FILTERING OF DIGITAL IMAGES DECODED BY TRANSFORMATION OF BLOCK

BACKGROUND OF THE INVENTION

1. Field of the Invention

The present invention relates to the filtering of animated digital images which are obtained after coding and decoding by transformation of pixel blocks respectively in a transmitting terminal and a receiving terminal, the purpose of these coding and decoding operations being to reduce the data bit rate in a transmission line linking the two terminals.

2. Description of the Prior Art

Current studies in telecommunications networks are notably oriented towards the transmission of images between subscribers. To do this, in view of the infrastructure of existing networks, it is necessary to use transmission means with a limited frequency bandwidth. For indicative purposes, an animated television image requires a digital bit rate of the order of a hundredth of Mbit/s, whereas basic access to the Integrated Services Digital Network (ISDN) offers two channels at a rate of 64 kbit/s, one being intended for the transmission of sound and the other, in such applications, for the transmission of images. For such a low transmission bit rate that can be typically included between 64 and 1,920 kbit/s, coding and decoding devices have been provided in the transmitter and receiver in order to compress the image to be transmitted, and more precisely to limit the data to be transmitted in the transmission line while correctly reconstituting the animated image by the receiver. Three main techniques have been advocated to meet these requirements:

a) coding by prediction: this consists in the transmission of a prediction error by the transmitter to the receiver, to be added to the predicted value of the image point derived in the receiver, the prediction algorithms being identical in the transmitter and receiver;

b) coding by transformation: this consists in representing the image in a different space of the image plane, for easier separation of redundant and relevant data of the image and for transmission of the latter only; and c) coding by approximation: this consists in deducing, from a part of the transmitted image, the other part of the image.

These three methods are combinable and separately call on three distinct operations, namely transformation, quantization and coding.

International standardization organizations, such as the CIE, CCITT and ISO, decided in 1988 to draw up a standard for the coding of fixed and animated images based on prediction, compensation of motion and discrete cosine transformation DCT (close to the Fourier transform). DCT transformation offers data compressing qualities, simplicity of use and compatibility with the standards being developed in the field of animated images (Visiophone (registered trade mark), digital television, . . . ).

Discrete cosine transformation consists in passing from a "visual" marking in which each picture element, called pixel, represents a brightness level varying e.g. from 0 to 255, to a "transformed" marking of the same dimension. The complexity in performing such operators being a function of the dimension (I.N)(J.N) of the image to be processed, the transformation applies to a plurality (I.J) of square blocks of pixels with dimension $N^2$ in the digitalized image, N, I and J being integers, and (I.N) and (J.N) denoting the number of lines of pixels and the number of columns of pixels in an image. Furthermore, as the function of the discrete cosine transform is to operate in a two-dimensional space where the coefficients are uncorrelated, a maximum level of uncorrelation between pixels of the image plane and "pixels" of the transformed plane is obtained thereby determining image blocks in which the pixels have a high level of correlation, which intuitively corresponds effectively to small image areas having substantially the same characteristics as regards brightness, color, etc. Typically, the values of N are equal to 8, 16 or 32.

This dividing into blocks of the digitalized image leads, at the level of the boundaries separating these blocks, to disturbance effects resulting in a mosaic impression in the image reconstituted by the receiving terminal.

These disturbance effects produce an appearance of block structure of the image, and are generated by:

discontinuities in brightness, or edge effects, at the boundaries of the blocks. This phenomenon is due to the fact that each block is virtually translated in the course of the transformation into an infinite and periodic (even) sequence for obtaining a periodic spectrum, and therefore transform coefficients in finite number; and an inter-block noise generated by quantization errors from a given block to an adjacent block, quantizations being applied on the transform coefficients.

For purely explanatory purposes, FIGS. 1A and 1B show two square blocks, BL1 and BL2, which are consecutive in an image and each have $N^2 = 64$ pixels, transmitted by a transmitter and reconstituted by a receiver. The image is presupposed to be in black and white. A closed curve CF in a dark line shows the appearance, as perceived by the eye, of the contour of a set of black pixels in the two blocks. A magnifying glass LO shows, by comparison with FIG. 1A, that in FIG. 1B, a break in the continuity of the curve is induced by these disturbance effects. The effect produced at the level of the entire image will be intuitively conceived.

OBJECT OF THE INVENTION

The main object of this invention is to attenuate, or indeed to suppress, the disturbance effects in an animated or fixed digitalized image, after the latter has been encoded and decoded by transformation of blocks, and before it is visualized e.g. on a television monitor.

SUMMARY OF THE INVENTION

Accordingly, there is provided a method for filtering a digital image obtained after coding and decoding by transformation and quantization of pixel blocks of dimension $N \times N$, N being an integer. Each of the blocks is comprised of N parallel segments of pixels having respective brightness levels, and is separated, in line and column, from adjacent blocks by respective boundaries.

The method comprises the following steps for each half-segment of said N segments in a given block separated from a corresponding colinear half-segment in one of the adjacent blocks by respective of said boundaries:

detecting discontinuity in brightness level with respect to a pixel of the each half-segment bordering on the respective boundary when two discrete gradients of brightness level depending respectively on brightness levels of two pixels adjacent to the bordering pixel have opposite signs;

and responsive to the brightness level discontinuity with respect to said bordering pixel being detected:

evaluating a discontinuity divergence equal to an absolute value of a difference between the brightness level of said bordering pixel and an arithmetical average of brightness levels of the two adjacent pixels; and correcting the brightness level of the bordering pixel into a corrected brightness level respectively by subtracting from the brightness level of said bordering pixel of a discontinuity correction factor which depends on the discontinuity divergence and on a quantization pitch used in the coding and decoding by transformation of the given block, when the brightness level of the bordering pixel is more than the arithmetical average, and by adding the discontinuity correction factor to the brightness level of the bordering pixel when the brightness level of the bordering pixel is less than the arithmetical average.

These first steps of the method contribute to attenuating the differences in brightness levels, such as peaks, right at the boundary between two adjacent blocks.

As will be seen in the description of a preferred embodiment hereinunder, the brightness levels are relative to one of the component video signals of an color image, such as luminance and chrominance. In practice, the method embodying the invention is used simultaneously for all the component video signals.

Preferably, the first steps of the method are followed by second steps improving the continuity of the image on both sides of the boundary between two adjacent blocks and thereby obviating the quantization errors between two adjacent blocks.

These second steps for said each half-segment in the given block and said corresponding colinear half-segment in the one of the adjacent blocks separated therebetween by said one of the boundaries, consist in:

evaluating a dummy brightness level at the one of the boundaries respectively equal to a sum of the corrected brightness level of the bordering pixel of the each half-segment and of a half-difference of the corrected brightness level and a brightness level of a pixel of the corresponding half-segment which is adjacent to the bordering pixel when the corrected brightness level of the bordering pixel is more than the brightness level of the pixel adjacent to the bordering pixel, and equal to a difference of the corrected brightness level of the bordering pixel and the half-difference when the corrected brightness level of the bordering pixel is less than the brightness level of the pixel adjacent to the bordering pixel;

evaluating a block divergence equal to a difference between two dummy brightness levels evaluated respectively for the each half-segment and the corresponding half-segment;

determinating a block correction factor as a function of the block divergence and of quantization pitchs used in the coding and decoding by transformation of the given block and one of the adjacent blocks respectively; and correcting brightness levels of pixel of the each half-segment and the corresponding half-segment respectively by subtracting from the pixel brightness levels the segment correction factor weighted by decreasing coefficients respectively in proportion to distances between the pixels and the boundary between the each half-segment and the corresponding half-segment, when the dummy brightness level relating to the each half-segment is more than the dummy brightness level relating to the corresponding half-segment, and by adding to the pixel brightness levels the block correction factor weighted by the coefficients when the dummy brightness level relating to the each half-segment is less than the dummy brightness level relating to the corresponding half-segment.

The spatial processing of a decoded digitalized image according to the invention can indifferently consider the lines or the columns of a block as segments of the block.

The spatial processing of the image is performed equally well in the horizontal direction and in the vertical direction.

The method thus comprises:

beforehand, a translation of each of the blocks of segments of the image into a block translated according to a half-diagonal of said block, then a series of stages complying with the above-mentioned stages and relating to each of the two half-segments each composing lines, respectively columns, of said translated block in order to consitute a first corrected block, and a series of stages complying with the above-mentioned stages and relating to each of the two half-segments each composing columns, respectively lines, of said translated block.

The invention further relates to a device for filtering digitalized images for implementing the method.

When the filtering device performs at least the first steps of the method, it comprises:

an input means for translating said decoded blocks according to a half-diagonal of the decoded blocks into translated blocks, each of the translated blocks having horizontal and vertical axes of symmetry corresponding to boundaries of the decoded blocks thereby producing in series N pixel segments of said each translated block, each of the pixel segments being formed with two colinear half-segments in two respective adjacent decoded blocks separated by a boundary;

a first means for successively evaluating, for each half-segment in the each of the pixel segments, a discontinuity divergence equal to an absolute value of a difference between a brightness level of a pixel of the each half-segment bordering on the boundary and a arithmetical average of brightness levels of two pixels adjacent to the bordering pixel and respectively included in the each half-segment and a corresponding half-segment which borders on the boundary and is colinear with the each half-segment;

a first means for determining, for the each half-segment, a discontinuity correction factor and a sign of the discontinuity divergence as a function of the discontinuity divergence and a quantization pitch used in the coding and decoding by transformation of the decoded block to which the each half-segment belongs; and a first means for correcting the brightness levels of the pixels in the each half-segment and corresponding colinear half-segment as a function of discontinuity correction factor and sign, thereby deriving first corrected brightness levels of the pixels in the each of the pixel segments When the filtering device also performs the second steps of the method, it comprises a second means for successively evaluating, for the each of the pixel segments, a block divergence equal to a difference between two dummy brightness levels evaluated respectively for the each half-segment and the corresponding colinear half-segment, a dummy brightness level for the each half-segment being evaluated as a sum and a difference of the corrected brightness level of the bordering pixel and of a half-difference of the corrected brightness level and a brightness level of the pixel included in the corresponding colinear half-segment and bordering on the boundary respectively when the corrected brightness level of the bordering pixel is less and more than the brightness level of the pixel included in the corresponding colinear half-segment, a second means for determining a block correction factor and a sign of the block divergence as a function of the block divergence and the quantization pitch; and a second means for correcting brightness levels of pixels of the each half-segment and the corresponding colinear half-segment by adding respectively and subtracting from the pixel brightness levels the block correction factor weighted by decreasing coefficients, in proportion to distances between the pixels and the boundary respectively when the dummy brightness level relating to the each half-segment is more and less than the dummy brightness level relating to the corresponding colinear half-segment.

Preferably, in order to reduce the cost of the filtering device, the first and second determining means are merged. The filtering device comprises a first means for multiplexing discontinuity divergences and block divergences into multiplexed divergences applied to the merged determining means which transmit multiplexed discontinuity and block correction factors to the first and second correcting means.

When the filtering device corrects the disturbance effects in an image in both line direction and column direction, it comprises a second means set of second means for evaluating, determining and correcting relating to second segments constituted by columns, respectively lines of the translated blocks, which is similar to a first means set including the first means relating to first segments constituted by lines, respectively columns of the translated blocks, and which operates subsequent to the first means set.

To further reduce the cost of this filtering device processing both the lines and the columns of image blocks, the first and second divergence evaluating means are merged, and the first and second means for determining correction factors are merged. In this case, the device comprises a first means for transposing each block of first corrected segments coming from the first means set, into transposed blocks, a second means for multiplexing the translated blocks and the transposed blocks into multiplexed blocks applied to the second means set, and a means for transposing the corrected blocks produced by the second means set.

BRIEF DESCRIPTION OF THE DRAWINGS

Further features and advantages of the invention will be apparent more clearly from the following description of several preferred embodiments of this invention as illustrated in the corresponding accompanying drawings in which.

DESCRIPTION OF THE PREFERRED EMBODIMENTS

Figure 1A:
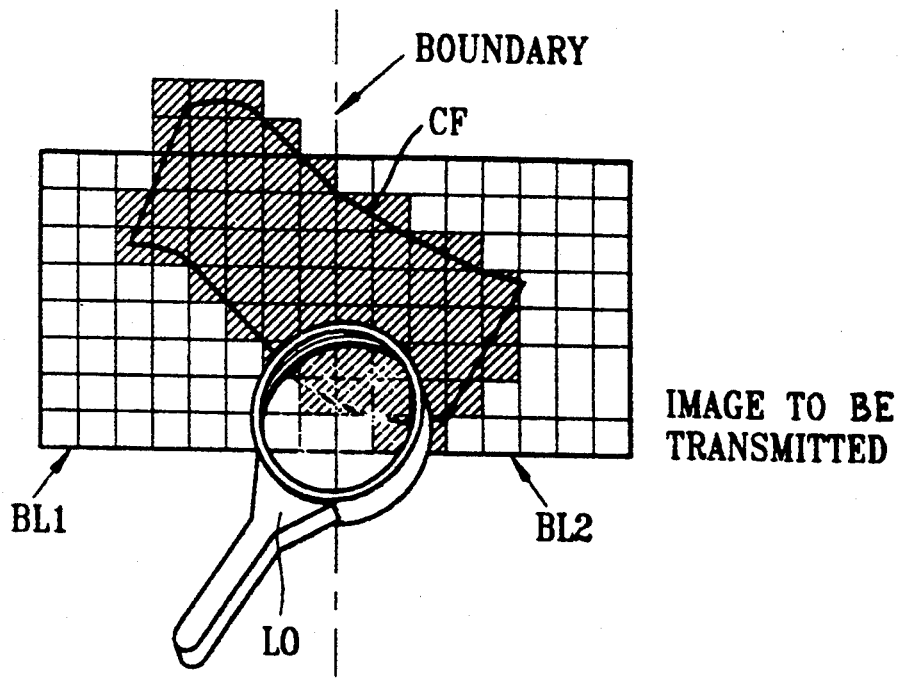
FIGS. 1A and 1B, previously commented, respectively show two image blocks transmitted and reconstituted to appreciate the effect of discontinuity at the boundaries of blocks.
Figure 1B:
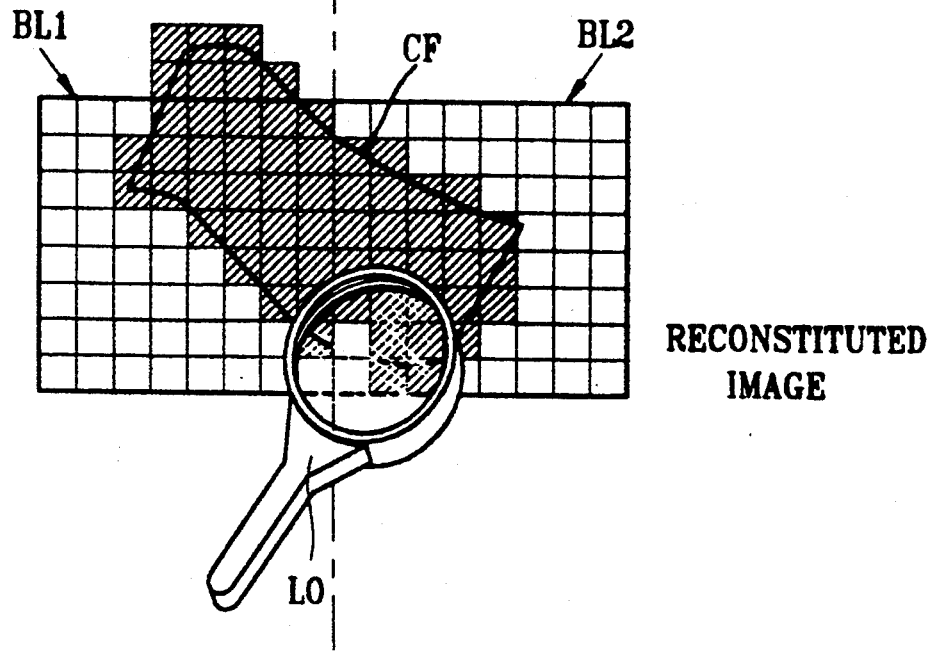
Figure 2:
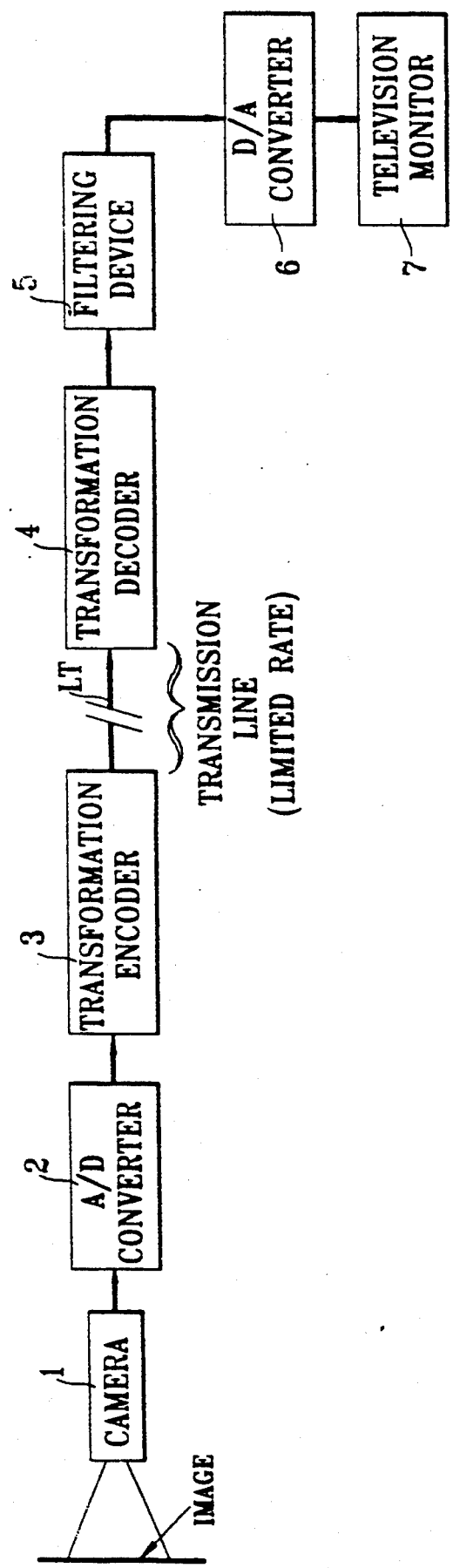
FIG. 2 is a schematic block-diagram of a transmission/reception chain for reduced-rate digital images, including a spatial filtering device embodying the invention.
Figure 3:
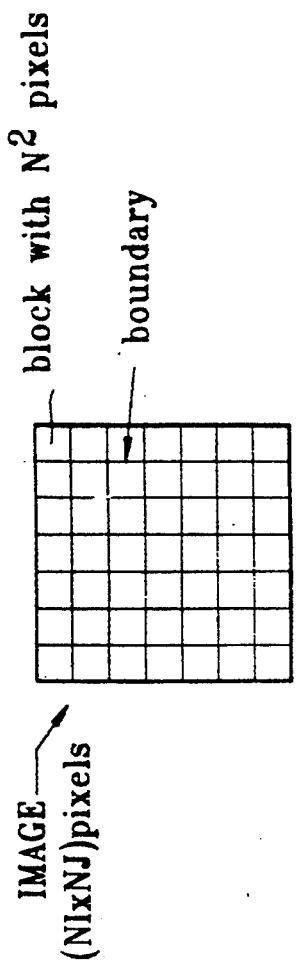
FIG. 3 shows an image of dimension (NI×NJ) pixels put into the form of a plurality of blocks of dimension (N×N) pixels.

In reference to FIG. 2, a chain of transmission of animated digitalized images embodying the prior art, e.g. within the framework of a video conference of the VISIOREUNION type between two distant groups of users, essentially comprises a video or a camera 1, an analog-to-digital color converter 2, an transformation encoder 3, a transmission line LT, a transformation decoder 4, a digital-to-analog color converter 6 and a color television monitor 7. The camera 1 produces the video analog signals relating to the luminance component L and the two interlaced chrominance components, representative of filmed animated images. The luminance component and the alternated chrominance components are sampled according to a predetermined television standard for each pixel in two 8-bit words in the converter 2 for transmission to the encoder 3. The encoder serially processes each of the two digitalized video components, after having previously divided the image into (I.N)(J.N) pixels in a plurality (I.J) of square blocks of dimension (N×N), as shown in FIG. 3. In practice, knowing that the alternated sampling periodicities of the chrominance components are equal to half that of the luminance component, the chrominance blocks each correspond to four luminance blocks. The prior dividing simplifies the processing of the transformation then performed on the blocks. This transformation operation is therefore performed on each of the blocks separately. The coefficients obtained by the transformation are then quantized and subsequently encoded for transmission in the transmission line LT.

An opposite operation to the operation performed by the encoder 3 is then carried out in the decoder 4. At a frequency taking into account man's psycho-visual limits, the decoder produces digital pixels of reconstituted animated images corresponding to the images initially filmed. These digital pixels are converted by the converter 6 into three video analog signals to be visualized in the form of the reconstituted images on the screen of the television monitor 7.

A filtering device 5 embodying the invention is inserted between the output of the decoder 4 and the input of the digital-to-analog converter 6, and receives blocks of each reconstituted image, comprised of digital pixels.

For the purposes of simplification, only one of the three video component signals, i.e., the luminance signal, is considered in the description hereinunder of the filtering device. In practice, the three component signals can be filtered in parallel by three filtering devices embodying the invention. The signal to be filtered will be called as a "video component signal" hereinafter. Likewise, the description is limited to a dividing of the image of dimension (I.N)(J.N) pixels into a plurality of square blocks with $N^2$ pixels, with $N = 8$, although other divisions into blocks of e.g. 16×16 pixels are possible within the scope of the invention. Consequently, in the description and in compliance with coding by transformation of blocks, each initial image is divided into square blocks of (8×8) pixels each comprising eight line segments or equally eight column segments of eight pixels each. A limit between two adjacent blocks is called "block boundary". These definitions are specified in FIG. 3.

Figure 4:
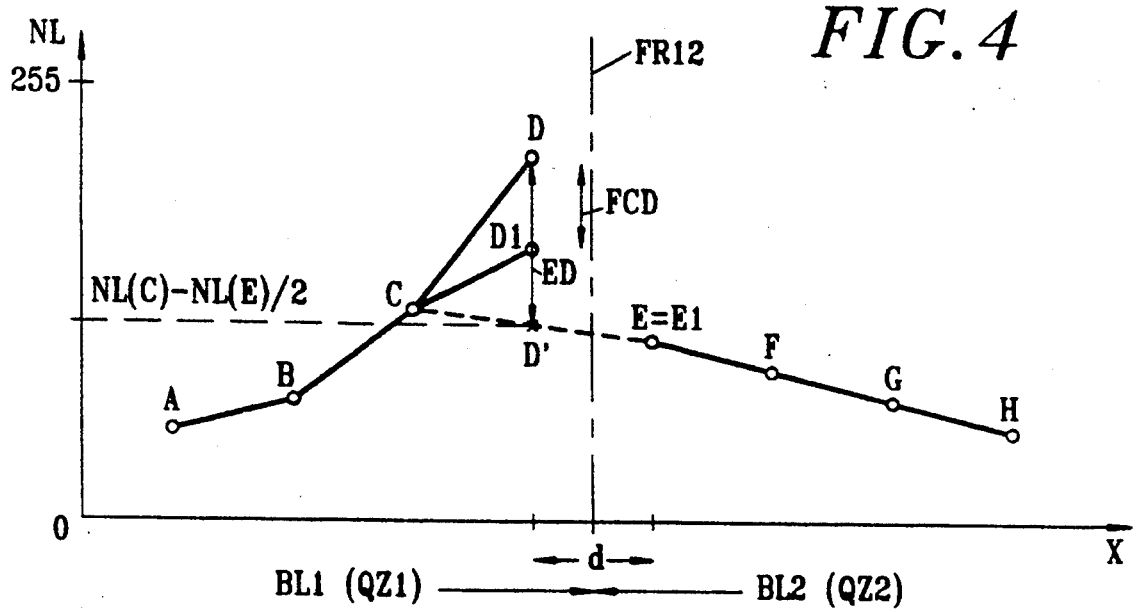
FIG. 4 is a diagram of the brightness level for line, respectively column, in two adjacent blocks for computation of a discontinuity divergence.
Figure 5:
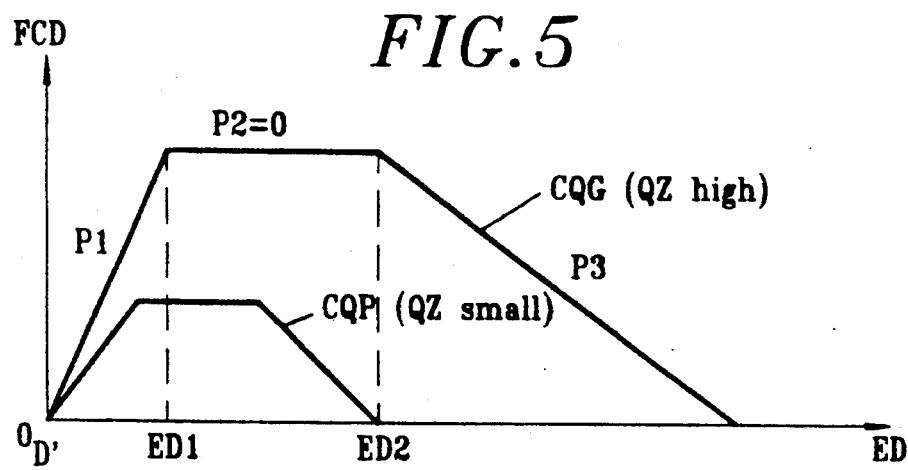
FIG. 5 shows two curves of discontinuity correction factor as a function of discontinuity divergence.

In reference to FIGS.4 and 5, a first set of steps constitutive of the image filtering method embodying the invention concerns the discontinuity of brightness at the boundaries of adjacent blocks.

FIG. 4 shows a spatial distribution of amplitude level of two half-segments, which each comprise $N/2=4$ image pixels A, B, C and D, respectively E, F, G and H and which are colinear on both sides of the boundary separating two adjoining blocks BL1 and BL2. In practice, these half-segments are two block half-lines, or two block half-columns, and correspond to $2(N/2) = 8$ successive pixels of a line and a column, respectively, in the image. The discontinuity faults relating to the encoding by transformation of block mainly appear at the level of the boundary separating the segments of the two blocks. The axis of abscissa designates the distance X from a central point of any pixel of the segment of the image to a point of origin 0 of the latter. The pixel corresponds to an elementary square d×d of the image where d is the distance between two consecutive points of the segment. The axis of ordinate relates to the brightness level NL of the video component signal, e.g. quantized from 0 to $(2^8-1)=255$, for the pixels of the two half-segments under consideration. A discrete representation of the brightness level is thus obtained. The distance between each of the central points of pixel A, B, C, D, E, F, G and H is equal to the length d of one side of a pixel. For the purposes of simplification, each point will be associated with a corresponding pixel for this first part of the method embodying the invention.

A "break" in the brightness appears at the boundary of block FR12, between points D and E, separating the two half-segments of the two adjacent blocks. This break corresponds in fact to a change of sign between two discrete gradients of brightness computed for point D, respectively with points C and E adjacent to point D. In fact, the difference between the brightness levels NL at point D and at point C preceding point D in the direction OX is positive, and the difference between the brightness levels at point E and at point D preceding point E in the direction OX is negative:

NL(D)−NL(C)>0

NL(E)−NL(D)<0

According to another example, a discontinuity at the boundary FR12 can be transcribed into inequalities having signs respectively opposed to the signs of the preceding inequalities, the level at point D being less than the levels at points C and E.

In order to suppress this discontinuity in brightness, it would be necessary a priori to linearize the brightness level of the pixel D bordering on the boundary with regard to the brightness level of pixels C and E, and thus compute a new brightness level for pixel D, corresponding to a pixel marked D' in FIG. 4. In that case, it is only necessary to compute the arithmetical average of the brightness levels of two adjacent pixels C and E for the bordering pixel D in order to obtain the new brightness level of pixel D in pixel D':

NL(D')=(NL(C)+NL(E))/2

This simple approach by linearization of a discontinuity pixel is not sufficient for a satisfactory filtering of the image, due to certain characteristics concerning the encoding by transformation method recalled hereinunder. As previously stated, the transformation operation consists in associating with a spatial representation of each image block, another type of representation, e.g. a frequency representation in the case of discrete cosine transformation (TCD).

After this image transformation thereby reducing the transmission bit rate, a quantization is carried out, consisting in a clipping for restricting the coefficients of the block having too high an amplitude, and a thresholding for eliminating those with too low an amplitude. Between these two extremes, a uniform linear quantization is applied for the coefficients of the transformed representation: a linear quantization pitch QZ is thus used for the quantization of the transformed coefficients of the block to be transmitted.

Nevertheless, this quantization pitch QZ is modified as a function of the dynamic advance of the image and of the spatial fineness required. In other words, the quantization pitch can change from one block to another in a same image, and can change in a same block located in the same place from one image to the next. In fact, the coefficients in the representation in discrete cosine transform each play a "role" in the reconstituting of the image both as regards the contours and general forms and as regards fineness and the "texture" of the image. The quantization pitchs QZ1 and QZ2 of the two blocks BL1 and BL2 are thus modified as a function of the dynamic advance of the image and depending on the limitation of the transmission bit rate. In a known manner, the quantization pitch of each block of images is transmitted with and before the selected quantized coefficients of the block, from the encoder 3 to the decoder 4, by time-division multiplexing, for reconstituting the block in the decoder.

Again in reference to FIG. 4, if the quantization pitch is small, a discontinuity divergence ED equal to the difference in brightness level between the initial bordering pixel D and the pixel corrected by linearity, as computed previously into point D' will be representative of a real discontinuity error only for low values of ED. Conversely, for high values of this divergence ED, again presupposing a small quantization pitch is used, these high discontinuity values indicate a "break" in the real brightness in the image (contour, . . . ), and not a discontinuity error due to the encoding.

To sum up, for this first set of steps, the invention therefore advocates the detection of discontinuity break in brightness, by computation for each of the bordering pixels D and E at the boundary of the two blocks BL1 and BL2, of two discrete gradients of brightness [NL(D)−NL(C)] and [NL(E) NL(D)]

[NL(F)−NL(E)] and [NL(E)−NL(D)], respectively with the two pixels adjacent to said bordering pixel. If the two gradients computed for the bordering pixel of the given block lead to two values having opposite signs, there is discontinuity. This operation is performed in the direction of the segments of the blocks constituting the image, i.e. for instance along the line sweeping from left to right, or according to the column sweeping from top to bottom. In the case of a discontinuity, a computation is made of the absolute value of the difference between the brightness level of the bordering pixel D and the arithmetical average NL(D')=[NL(E)+NL(C)]/2 of the brightness levels of the pixels E and C adjacent to said bordering pixel D. This computation of the absolute value gives the discontinuity divergence ED. With this discontinuity divergence is associated a discontinuity correction factor FCD as a function of the quantization pitch QZ used for the encoding and decoding of the block.

As an indication, two curves CQP and CQG shown in FIG. 5 were experimentally obtained and are representative of the function FCD(ED). The two curves CQP and CQG correspond to two respectively low and high quantization pitch values. The smaller the quantization pitch QZ1, QZ2 of the block BL1, BL2, the more the discontinuity error ED will be representative of a natural characteristic of the image, as has been previously specified. The brightness level of the discontinuous bordering pixel D is thus corrected by the associated discontinuity correction factor FCD which depends on the discontinuity error ED initially computed. More precisely, this discontinuity correction factor FCD associated with the discontinuity error ED and selected as a function of quantization pitch is added to or subtracted from the brightness level of the discontinuous bordering pixel D, as a function of the sign of the difference between the level of the bordering pixel D and the average of the levels of the adjacent points C and E, i.e. NL(D1)=NL(D) $k_D$.FCD(ED)

with $k_D=1$ if NL(D)<NL(D') and $k_D=-1$ if NL(D)>NL(D').

According to FIG. 5, the illustrated curves CQP and CQG which have produced perfectly acceptable image correction results, are each composed of three straight line segments forming a trapezium with the ED-axis from the origin $O_D$, corresponding to ED=0. For instance, the curve CQP comprises a first straight line segment having a positive slope P1, originating at point 0 and having as end a point of abscissa ED1, a second straight line segment having a slope P2=0, parallel to the axis of abscissa and included between the points of abscissa ED1 and ED2, and a third straight line segment having a negative slope P3, such that |P3|<P1, and originating at point of abscissa ED2.

To each quantization pitch QZ corresponds a 16-bit word including a 2-bit word for slope P1, a 6-bit word for abscissa ED1, a 2-bit word for slope P3, and a 6-bit word for abscissa ED2, which enables the correction curve to be deduced. As will be seen hereinafter, the 16-bit words of the correction parameters are included in a memory of tables addressed by the block quantization pitch. In practice, the values of P1 an P2 can take on four values, e.g. ¼, ½, 1 and 2.

It should be noted that according to FIG. 4, the inequalities NL(D)>NL(E)>NL(F) imply the absence of discontinuity at point E of block BL2, and therefore no correction, i.e. E=E1; conversely, if N(E)<NL(F), point E would be corrected into a point E1.

To the effects of discontinuity, in the appearance of the reconstituted image, is added a "block effect" due to an error in quantization from one block to a block adjacent to said block. This block effect results in a discontinuity on the average brightness value of adjacent blocks. It is recalled that this average value of the brightness levels of the N×N=64 pixels in a block is indicated by the first coefficient representative of the low-frequency component in the transformed representation of the block. A low difference in amplitude between two respective coefficients of the same rank in two adjacent blocks can generate different quantization levels for the encoding of the blocks. After decoding, the two adjacent blocks then appear with different average brightness levels depending on the respective quantization levels transmitted by the encoder to the decoder.

The purpose of these second steps of the filtering method embodying the invention is to reduce this block effect and therefore, in practice, to impose on the image reconstituted, after the filtering embodying the invention, an appearance of "natural continuity" of brightness between adjacent blocks. This block effect is all the more pronounced when the quantization pitch is large, or when the difference between the quantization pitchs relating to the two adjacent blocks is large.

Figure 6:
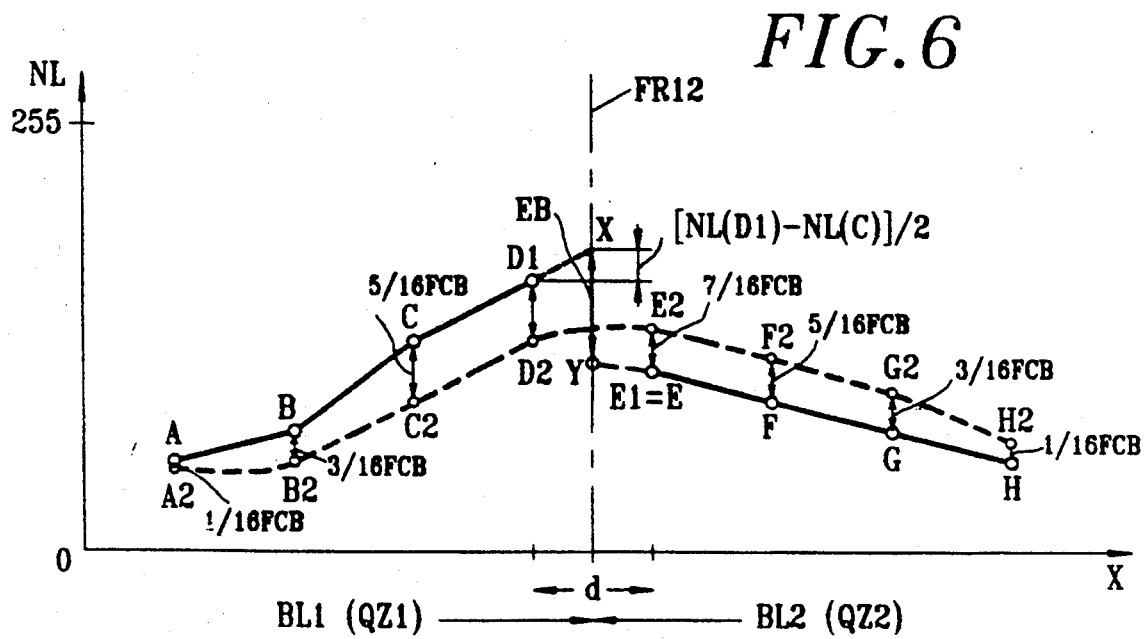
FIG. 6 is a diagram of the brightness level for a line, respectively column, in two adjacent blocks for computation of a block divergence and a correction of this divergence.

This second step of the method concerns, as previously, each of the half-segments of pixels, i.e., two half-lines or half-columns, of two adjacent blocks separated by a block boundary, and is explained hereinunder in reference to the brightness level diagram shown in FIG. 6.

In order to accentuate the fineness of the spatial filtering for these second steps of the method, and knowing that the eight points of the two colinear half-segments A to D and E to H in the adjacent blocks BL1 and BL2 are imaginary central points of the corresponding pixels, voluntarily associated with the pixels in the preceding first steps, it is proposed to "predict" two purely dummy brightness levels of two imaginary points X and Y located on the boundary FR12 between blocks BL1 and BL2. This can be derived by a transposition of a discrete representation of a pixel-based image into a continuous (points) representation corresponding to reality. In this way, each pixel being a square with side of predetermined fixed length d (resolution of the image), the computation is made, for each bordering pixel corrected in discontinuity D1, E1 at the block boundary FR12, of a difference of brightness level between the bordering pixel and the adjacent pixel C, F of the same segment of the block. The bordering pixels are the pixels D1 and E1 corrected for discontinuity according to the first steps of the method. To the brightness level of a bordering pixel, e.g. D1, is added or subtracted, as a function of the sign of the difference, half the above-mentioned difference to obtain, by prediction, the brightness level of a dummy point X at the block boundary since the distance separating an imaginary central point of pixel D1 from the boundary is equal to the half-length d/2 of one side of a pixel. This operation results, e.g. for pixel D1, in the following relation:

NL(X)=NL(D1)+[NL(D1)−NL(C)]/2

Two brightness levels NL(X) and NL(Y) for two dummy points X and Y are thus obtained from the two bordering points D1 and E1. The bordering pixels (or points) D1 and E1 represented in FIG. 6 are pixels processed for discontinuity at the block boundary; a block divergence EB equal to $|NL(X)-NL(Y)|$ must be applied to both half-segments, since it corresponds to a quantization error between the two respective average components of the two blocks.

This notion must be specified by analogy with thermodynamics. When two respectively hot and cold bodies (two half-segments having different average brightness levels) are brought into contact, a homogenizing of the temperatures (of the image) of the two bodies takes place by modification of the temperature of each of the points constituting them (pixels) proportionally to the distance separating them from the sides of the bodies in contact (block boundary). For the image, this analogy must cease at the moment of reaching between the two half-segments an average brightness difference which is natural to the image (natural darkening of the block, ...).

In a similar manner to the first steps of the method, if the block divergence EB, equal to the difference in brightness levels NL(X)−NL(Y) between two dummy points at the block boundary, reaches a high value whereas the quantization pitch QZ is small, the block divergence is not only due to the quantization, but certainly constitutes a natural element in the image (darkening).

Thus, with this block divergence EB is associated a block correction factor FCB for the half-segments of blocks BL1 and BL2, as a function of quantization pitchs QZ1, QZ2 in these blocks, respectively. Curves substantially similar to those presented in reference to FIG. 5 have been experimentally obtained in order to associate with each block divergence EB, a block correction factor FCB selected as a function of the two quantization pitchs. As explained by analogy with thermodynamics, a natural homogeneity of the image is obtained by weighting this block correction factor FCB by respective coefficients decreasing in proportion to the distance of the pixel in question from boundary FR12. These different weighted block correction factors are subtracted from or added to the respective pixels of the two half-segments, as a function of the sign of the difference between the brightness levels NL of the bordering pixels D1 and E.

As an example, as illustrated in FIG. 6, the weighting coefficients are 7/16, 5/16, 3/16 and 1/16 for the four respective pixels D1, C, B and A; E1, F, G and H of a half-segment. The ordinates of the coefficient weighted points D2, C2, B2 and A2; E2, F2, G2 and H2 in FIG. 6 represent the brightness levels obtained after correction of the block effect.

A digitalized image filtering device for implementing the above-mentioned first and second steps of the method embodying the invention will now be described in reference to FIGS. 7, 8 and 9.

Figure 7:
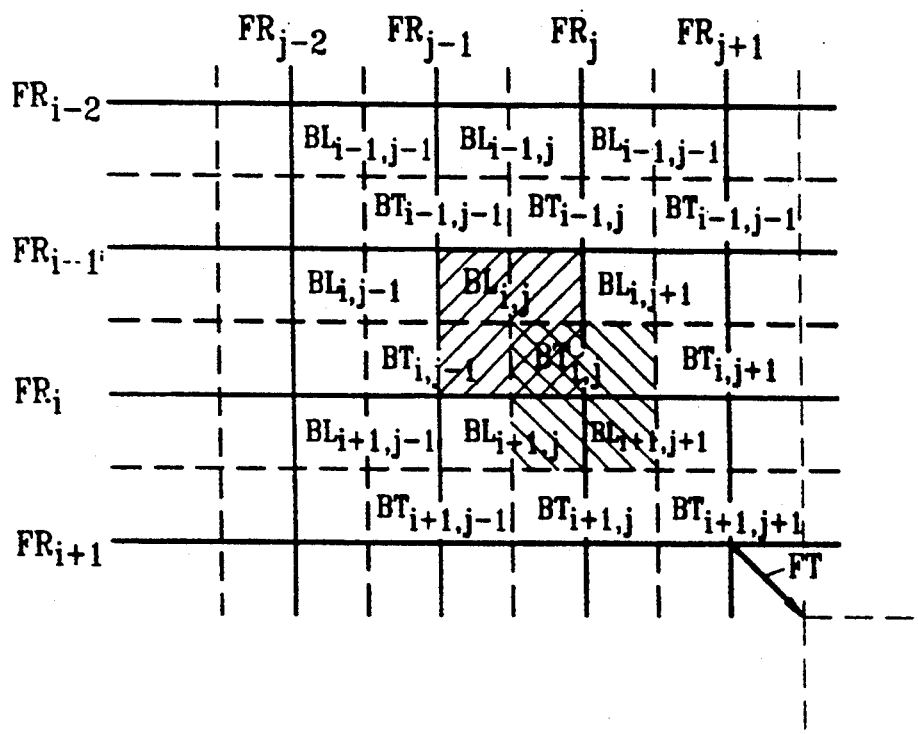
FIG. 7 is a partial diagram of an image showing a translation operation performed on initial image blocks.

According to the method of the invention described hereinunder, the steps of the method are applied in relation to the boundaries of the blocks with $N^2=8\times 8$ pixels divided up in the image for coding by transformation, and more precisely in relation to groups of two and four line or column pixels on both sides of the boundaries FIG. 7 shows that each block $BL_{i,j}$ adjoins four adjacent blocks $BL_{i,j-1}$, $BL_{i-1,j}$, $BL_{i,j+1}$ and $BL_{i+1,j}$ and is separated from the latter respectively by four boundaries $FR_{j-1}$, $FR_{1-i}$, $FR_j$ and $FR_i$, i and j being integer indices respectively lying between 1 and I, and 1 and J. In order to carry out the filtering processing embodying the invention on each couple of half-lines and each couple of halfcolumns divided by the corresponding boundaries, the initial square blocks $BL_{i,j}$ are transformed into square blocks $BT_i$, in which are translated in one of the block diagonal directions and by a pitch equal to a block half-diagonal, as indicated by the arrow FT in FIG. 7. The boundaries of the initial blocks $BL_{i,j}$ constitute horizontal and vertical central axes of the translated blocks $BT_{i,j}$. FIG. 8 shows in greater detail a translated block $BT_{i,j}$ which is composed of $8\times 8=64$ pixels, i.e., a matrix of 8 line (rank) segments with 8 pixels $LI_1$ to $LI_N$ and 8 column segments with 8 pixels $CO_1$ to $CO_N$, and of which the horizontal and vertical axes $FR_i$ and $FR_j$ correspond to two perpendicular boundaries of the initial block $BL_{i,j}$.

Figure 9:
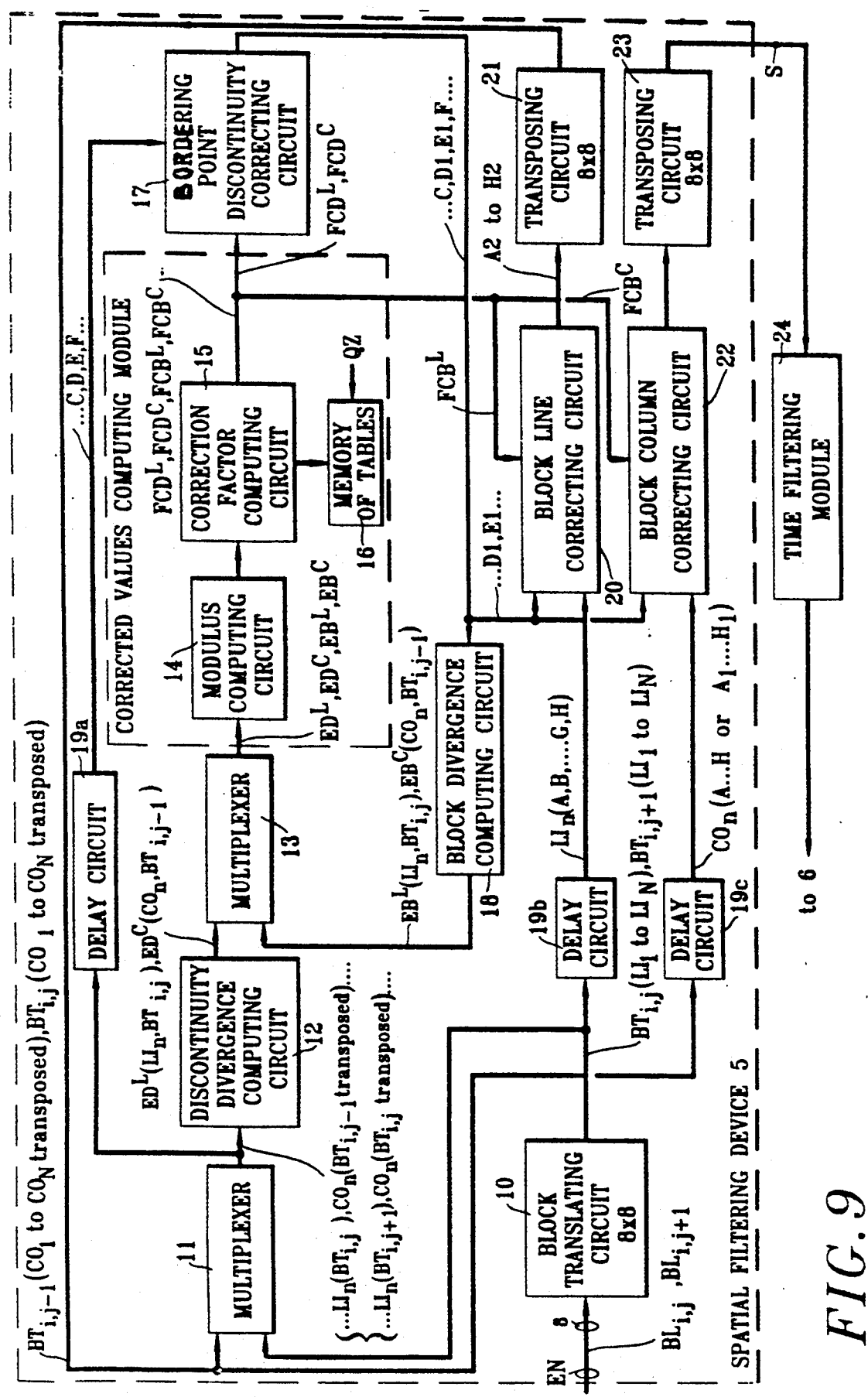
FIG. 9 is a block diagram of the spatial filtering device embodying the invention.

As shown in FIG. 9, the spatial filtering device 5 embodying the invention comprises a block translating circuit 10, a first multiplexer 11, a discontinuity divergence computing circuit 12, a second multiplexer 13, a modulus computing circuit 14, a correction factor computing circuit 15 associated with a memory of tables 16, a discontinuity correcting circuit 17, a block divergence computing circuit 18, a first delay circuit 19a and two second identical delay circuits 19b and 19c, two circuits 20 et 22 for correcting block with respect to line and column, respectively and two block transposing circuits 21 and 23.

The relative complexity of the filtering device is due to the two-way processing, for lines and columns, performed on each of the blocks translated in an image. In fact, the discontinuity correction according to FIGS. 4 and 5 and the block correction according to FIG. 6 are performed on each of the line segments and column segments of the translated blocks.

Each digitalized image reconstituted by the decoder 4 (FIG. 2) is applied in the form of pixel digital signals to an input EN of the filtering device. This input EN is in practice an eight-wire bus which applies groups of $N=64$ successive pixel words each having 8 parallel bits to the input of circuit 10, the word groups representing in digital form the digital reconstituted blocks $BL_{i,j}$. All the circuits included in the filtering device are digital circuits which are controlled via a time-base (not shown) connected to the decoder 4, by various clock signals signalling notably the period of the pixel words, the period of the 8-pixel segments, the start and end of each block, the start and end of each image, and the quantization pitchs of the initial blocks. The circuit 10 carries out a translation of blocks $BL_{i,j}$ in the reconstituted image into translated blocks $BT_{i,j}$ of $8\times 8$ pixels, having horizontal and vertical axes corresponding to block boundaries in the division of the image for encoding and decoding by transformation of blocks. The circuit 10 produces at output 8 brightness level words respectively for the 8 pixels of each of the eight lines of a translated block.

Figure 8:
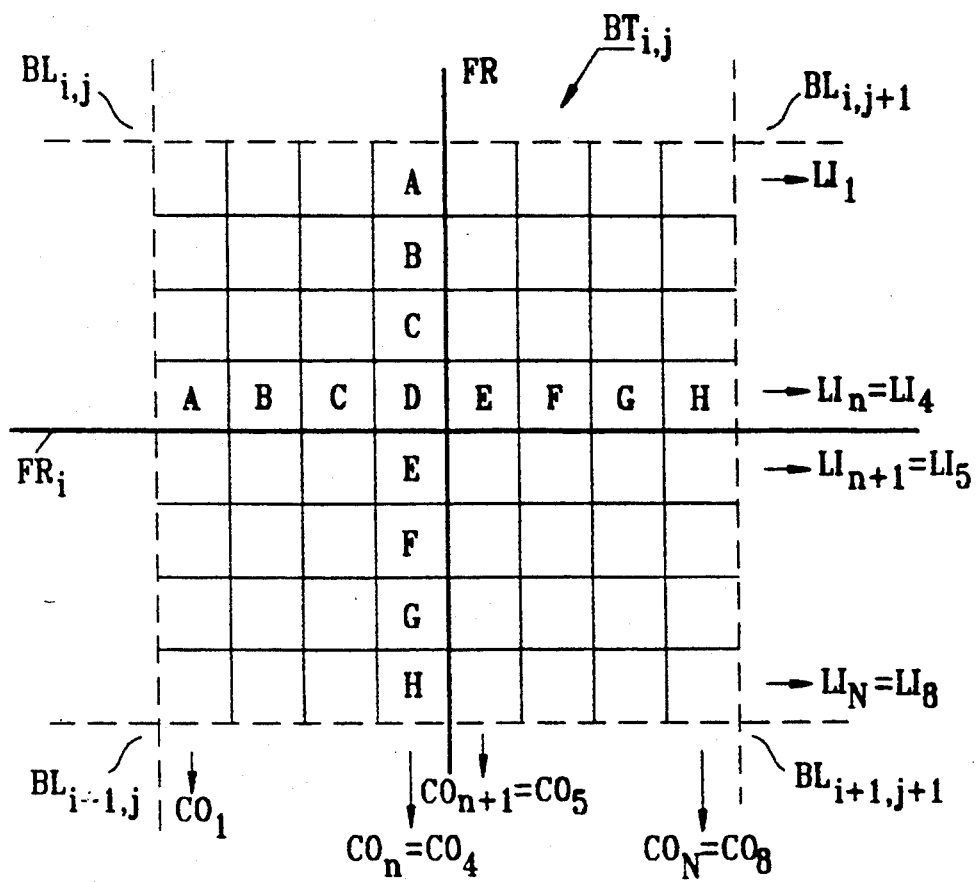
FIG. 8 shows a translated block.

The operating cycle of the filtering device 5 in relation to a translated block, explained in detail hereinunder, is broken down, in compliance with the method having two sets of steps of the invention, into two successive steps for each of the line segments $LI_1$ to $LI_N$, then for each of the column segments $CO_1$ to $CO_N$ in a translated block $BT_{i,j}$ (FIG. 8).

According to a simple embodiment of the filtering device, the latter could comprise a processing chain comprising in series a first means for successively computing correction factors $FCD^L$ and $FCB^L$ of the N line segments, the exponent "L" indicating a correction relating to a line, and for consequently correcting the line segments into first corrected segments constituting a first corrected block, then a second means for successively computing correction factors $FCD^C$ and $FCB^C$ of N column segments from the first corrected block, the exponent "C" indicating a correction relating to a column, into second corrected segments constituting a second corrected block.

Such an embodiment comprises two computing and correcting means which are identical since the processing of a block is bidimensional. In order to reduce the cost of the filtering device, the embodiment illustrated in FIG. 9 only comprises one computing and correcting means used both for the line segments and the column segments. This computing and correcting means is mainly constituted by the circuits 12 to 18 as regards the computation of the correction factors. However, the successive processings of the set of line segments, then of the set of column segments, imposes two conditions.

The first condition consists in transposing the first corrected block after correction of all the line segments in the translated block and before correction of all the column segments, in order for the columns of the first corrected block to be applied in series like lines to circuits 12 to 18. The final correction of the line segments, in relation to the block correction factors $FCB^L$, is carried out in circuit 20 and the transposition of the first corrected block is performed in circuit 21. Likewise, circuit 22 corrects the columns transposed into lines of the first corrected block, and circuit 23 transposes the lines of the first corrected block, after correction of all the columns transposed into lines, into columns of the second corrected block in order for this block to correspond to the incoming but line- and column-corrected translated block.

The second condition results from the duration of processing of a block which, a priori, is at least equal to twice the duration of transmission of the N line segments of the translated block $BL_{i,j}$ at input, since N line segments are processed, and then N column segments are processed. In other words after the N line segments of block $BT_{i,j}$ have been entered and processed, the N line segments of the next block $BT_{i,j+1}$ are transmitted from the block translating circuit 10. For this purpose, a first multiplexer 11 is provided in the filtering device for two-by-two multiplexing the N segments of columns transposed into lines of the first corrected block outgoing from circuit 21 and relating to block $BT_{i,j}$, and the N line segments of the next block $BT_{i,j+1}$ outgoing from circuit 10. Thus, for a given block $BT_{i,j}$, the N line segments of the block $BT_{i,j}$ transmitted from circuit 10 are corrected in circuits 12 to 18 and 20 while the N transposed-into-line column segments in the previous block $BT_{i,j-1}$ transmitted by the transposing circuit 21 are corrected by circuits 12 to 18 and 22; then in a similar way, the N transposed-into-line column segments in the given block $BT_{i,j}$ transmitted by the transposing circuit 21 are corrected in circuits 12 to 18 and 22, while the N line segments in the next block $BT_{i,j+1}$ transmitted from circuit 10 are corrected in circuits 12 to 18 and 20.

The two previous conditions imply a relative complexity of the filtering device, though the cost of the latter is reduced by comparison with the simple embodiment.

The operation of the filtering device 5 will now be described mainly for the correction of any line segment $LI_n$ in block $BT_{i,j}$, then for the correction of any transposed-into-line column segment $CO_n$ in the first line-corrected block corresponding to block $BT_{i,j-1}$, n being a integer index lying between 1 and N=8.

Each of the 8-pixel-word signals relating to the line segments in the translated block $BT_{i,j}$ is applied to an input of the block line correcting circuit 20 via the delay circuit 19b. The circuit 20 corrects each $LI_n$ of the N line segments in the translated block $BT_{i,j}$ thus received as a function of a respective block correction factor $FCB^L$ which is applied to a factor input of circuit 20 and which is computed according to the second steps of the method. The eight block correction factors for the lines of blocks $BT_{i,j}$ are in relation to the couples of quantization pitches in the blocks $BL_{i,j}-BL_{i,j+1}$ and $BL_{i+1,j}-BL_{i+1,j+1}$ which are respectively used for the first four and last four lines of block $BT_{i,j}$. The line segments thus successively corrected are stored in a RAM memory included in the transposing circuit 21 which is read for transposing the first line-corrected block into columns $CO_1$ to $CO_N$ when the 8 line segments $LI_1$ to $LI_8$ have been corrected. The 8 column segments of the first line-corrected block are thus applied in series by the circuit 21 to a second input of the multiplexer 11.

Simultaneously, when this second input receives the transposed column segments $CO_1$ to $CO_N$ of block $BT_{i,j-1}$, a first input of the multiplexer 11 receives from circuit 10, the lines of the next translated block $BT_{i,j}$ and multiplexes them. For instance the multiplexed line segment $LI_1$ of block $BT_i$ and transposed column segment $CO_1$ of block $BT_{i,j-1}$ are successively applied to circuits 12 and 19a. Circuit 12 successively computes two discontinuity divergences respectively for the multiplexed line segment and column segment and produces at output two respective discontinuity divergences $ED^L$ and $ED^C$ according to the first steps of the method.

The two respective block divergences $EB^L$ and $EB^C$ are supplied at a first input of multiplexer 13 so that circuits 14 and 15 proceed to compute corresponding discontinuity correction factors $FCD^L$ and $FCD^C$ as a function of the quantization pitchs QZ. As previously indicated, the quantization pitchs are supplied by the decoder 4 before correction of the blocks of a reconstituted image and address the tables memory 16.

Thus, in order to correct the first four and last four line segments $LI_1$ to $LI_4$ and $LI_5$ to $LI_8$ in block $BT_{i,j}$, the memory 16 supplies correction curve parameter words which depend on the quantization pitchs of blocks $BL_{i,j}$ and $BL_{i,j+1}$, respectively of blocks $BL_{i+1,j}$ and $BL_{i+1,j+1}$, for the circuit 15 to compute the two factors $FCD^L$ of each of the eight transposed column segments. Likewise, to correct the first four and last four transposed column segments $CO_1$ to $CO_4$ and $CO_5$ to $CO_8$ in the first corrected block $BT_{i,j}$, the memory 16 supplies parameter words which depend on the quantization pitch of blocks $BL_{i,j}$ and $BL_{i+1,j}$, respectively of blocks $BL_{i,j+1}$ and $BL_{i+1,j+1}$, for the circuit 15 to compute the two factors $FCD^C$ of each of the eight transposed column segments. It is recalled that the correction curves are of the type of those illustrated in FIG. 5. The computing circuit 14 computes the modulus (absolute value) of the discontinuity divergence $ED^L$, $ED^C$ corresponding to a difference of brightness level which can be either positive or negative. The sign of this divergence is of little importance for computing the correction factors $FCD^L$, $FCD^C$ which each depend on a quantization pitch QZ in a quarter of block $BT_{i,j}$ for points D and E (FIG. 4). The discontinuity correction factors $FCD^L$, $FCD^C$ with the signs of the divergences $ED^L$, $ED^C$ are provided in multiplexed form by circuit 15 to circuit 17.

The bordering point (D1, E1) discontinuity correcting circuit 17 receives the two multiplexed discontinuity correction values $FCD^L$ and $FCD^C$ and the line segments $LI_n$ and the column segments $CO_n$ multiplexed to a second input of circuit 17 via the delay circuit 19a. The delay circuit 19a delays the couples of multiplexed line and column segments by a duration necessary for the computation of the divergence and correction factor performed by circuits 12 to 15. Circuit 17 thus simultaneously receives a transposed line $LI_n$ or column $CO_n$ segment and the two discontinuity correction factor $FCD^L$ or $FCD^C$ thereby producing at output a segment and particularly discontinuity-corrected brightness levels NL(D1) and NL(E1) according to FIG. 4, and this for the line $LI_n$ of block $BT_{i,j}$ and the column $CO_n$ of block $BT_{i,j-1}$. Subsequent to the end of these first steps of the method, the corrected segment is applied to an input of the block divergence computing circuit 18 which computes the corresponding block divergence $EB^L$, $EB^C$ according to the second steps of the method.

Block divergence couples $EB^L$, $EB^C$ derived by circuit 18 are thus applied to a second input of multiplexer 13 to be multiplexed with discontinuity divergence couples $ED^L$, $ED^C$.

Circuits 14 and 15 are again used to compute the block correction factors $FCB^L$ and $FCB^C$ corresponding to the couple $EB^L$ and $EB^C$. The block correction factor for each of the transposed line or column segments depends on the two quantization pitchs QZ of the two adjacent blocks from which the half-segments of the segment are issued, in a similar manner to the first steps. Circuit 14 also derives the modulus and the sign of the corresponding divergence $EB^L$, $EB^C$ for the divergence modulus to be used for the computation of factor $FCB^L$, $FCB^C$ in circuit 15, and the divergence sign indicates to the corresponding correcting circuit 20, 22 whether the factor must be subtracted from or added to the levels of the half-segments, such as A, B, C and D1, and E1, F, G and H (FIG. 6) of the segment under consideration.

When the factor $FCB^L$ of a line segment $LI_n$ is applied by circuit 15 to the factor input of correcting circuit 20, the first level word of pixel A in segment $LI_n$ is applied by delay circuit 19b to circuit 20. The levels of the segment pixels are thus successively corrected at the end of these second steps. However, at the end of the first steps, the levels of the corrected points, such as D1 and E1, transmitted by circuit 17, are memorized in circuit 20 for pixels D1 and E1, instead of points D and E, to be corrected into pixels D2 and E2 (FIG. 6) when the corresponding factor $FCB^L$ has been computed. The levels of the corrected pixels A2 to H2 are thus successively memorized in transposing circuit 21 until the N=8 line segments of the block under consideration are corrected, before proceeding with the transposition of the columns of the first corrected block under consideration.

In a similar manner, the levels of pixels D1 and E1 of a transposed column segment $CO_n$ transmitted by circuit 17 are temporarily memorized in correcting circuit 22 at the end of the first steps, and the corresponding correction factor $FCB^C$ is applied to circuit 22 when delay circuit 19c connected to the output of transposing circuit 21 supplies the level of the first pixel A of the transposed column segment $CO_n$. The levels of the eight pixels of this segment are thus successively corrected in circuit 22 and memorized in circuit 23. After complete correction of the eighth transposed column segment, circuit 23 proceeds to transpose the second corrected block thus produced in order for the latter to be transmitted line segment by line segment through an output S of the filtering device 5.

It should be noted that, in compliance with the two sets of steps of the method, the first and last three transposed column segments of the first corrected block corresponding to a block $BT_{i,j}$ are identical to columns $CO_1$ to $CO_3$ and $CO_5$ to $CO_8$ in block $BT_{i,j}$, since the first steps only correct the central pixel levels D and E into pixels D1 and E1. On the other hand, the fourth and fifth central transposed segments of the first transposed block applied from circuit 21 to circuit 22 via delay circuit 19c only comprise levels of points A1 to H1 corrected by correcting circuit 17.

From what has been stated above, it appears that the delay circuits 19b and 19c each impose a delay equal to the sum of:

the duration of computation of two successive discontinuity correction factors $FCD^L$ and $FCD^C$ in circuits 12 to 16, which corresponds substantially to the delay imposed by the first delay circuit 19a;

the duration of two discontinuity corrections in circuit 17 and of the two block divergence computations in circuit 18, and the duration of computation of two block correction factors in circuits 13 to 16.

Thus, in practice, the delay imposed by each of delay circuits 19b and 19c is substantially equal to three times the delay imposed by circuit 19a.

As shown in FIG. 9, a known type of time filtering module 24 is preferably connected in series at output S of the spatial filtering device 5 embodying the invention for notably attenuating the inter-image noise between two successive images. The time filtering module 24 comprises a programmable recursive filter. Each processed image produced at output S of the device 5 is compared with the previously processed image and is memorized in an image memory for being compared with the next image.

Each image is then corrected as a function of a difference which has been deduced from the comparison with the previous image, according to a non-linear law of this difference. Low amplitude differences are reduced, whereas high amplitude difference are not modified.

What we claim is:

1. A method for filtering a digital decoded image obtained after encoding and decoding by transformation and quantization of pixel blocks of an initial image of a dimension N×N, N being an integer, said digital decoded image being formed into a plurality of blocks each comprised of N parallel segments of pixels having respective brightness levels and being separated, in line and column, from adjacent blocks by respective boundaries, said method comprising the steps for each half-segment of said N segments in a given block separated from a corresponding collinear half-segment in one of said adjacent blocks by a respective one of said boundaries of:

(a) detecting a discontinuity in the brightness level with respect to a pixel of said each half-segment bordering on said respective boundary when two discrete gradients of brightness level depending respectively on brightness levels of two pixels adjacent to said bordering pixel have opposite signs;

(b) evaluating in response to said brightness level discontinuity a discontinuity divergence equal to an absolute value of a difference between the brightness level of said bordering pixel and an arithmetical average of brightness levels of said two adjacent pixels;

(c) correcting said brightness level of said bordering pixel into a corrected brightness level respectively:
  (1) by subtracting from said brightness level of said bordering pixel a discontinuity correction factor (FCD) which depends on said discontinuity divergence and on a quantization pitch (QZ) used in said encoding and decoding by transformation of said given block, when said brightness level of said bordering pixel is more than said arithmetical average, and
  2) by adding said discontinuity correction factor to said brightness level of said bordering pixel when said brightness level of the bordering pixel is less than said arithmetical average, and;

(d) reconstituting a digital reconstituted image which is substantially analogous to said initial digital image and which includes said pixel blocks of said digital decoded image with said bordering pixels having brightness levels uncorrected and corrected, respectively, according to said detecting, evaluating and correcting steps;

and further comprising the steps for said each half-segment in the given block and said corresponding collinear half-segment in one of said adjacent blocks separated therebetween by said one of said boundaries of:

(e) evaluating a dummy brightness level at said one boundary:
  (1) equal to a sum of said corrected brightness level of said bordering pixel of said each half-segment and of a half difference of said corrected brightness level of said bordering pixel and a brightness level of a pixel of said corresponding half-segment which is adjacent to said bordering pixel when said corrected brightness level of said bordering pixel is more than said brightness level of said pixel adjacent to said bordering pixel, and
  (2) equal to a difference of said corrected brightness level of said bordering pixel and said half-difference when said corrected brightness level of said bordering pixel is less than said brightness level of said pixel adjacent to said bordering pixel;

(f) evaluating a block divergence equal to a difference between two dummy brightness levels evaluated respectively for said each half-segment and said corresponding half-segment;

(g) determining a block correction factor as a function of said block divergence and of quantization pitches used in the coding and decoding by transformation of said given block and one of the adjacent blocks respectively.; and (h) correcting brightness levels of pixel of said each half-segment and said corresponding half-segment, respectively:
  (1) by subtracting from said pixel brightness levels said segment correction factor weighted by decreasing coefficients respectively in proportion to distances between said pixels and said boundary between said each half-segment and said corresponding half-segment, when said dummy brightness level relating to said each half-segment is more than said dummy brightness level relating to said corresponding half-segment, and
  (2) by adding to said pixel brightness levels said block correction factor weighted by said coefficients when said dummy brightness level relating to said each half-segment is less than said dummy brightness level relating to said corresponding half-segment.

2. The method as claimed in claim 1 wherein said discontinuity correction factor is a substantially trapezoidal function of said discontinuity divergence for a predetermined quantization pitch.

3. The method as claimed in claim 1, wherein the integer N is equal to eight and said coefficients are 7/16, 5/16, 3/16 and 1/16.

4. The method as claimed in claim 1, wherein said segments are alternatively lines and columns of pixels in said blocks.

5. A digitalized image filtering device for filtering a digital decoded image obtained after encoding and decoding by transformation and quantization of blocks of pixels of an initial image of dimension $N \times N$, N being an integer, said digital decoded image being bound into a plurality of blocks each comprised of N parallel segments of pixels having respective brightness levels and being separated, in line and column, from adjacent decoded blocks by respective boundaries, comprising:

(a) input means for translating said decoded blocks according to a half-diagonal of said decoded blocks into translated blocks, each of said translated blocks having horizontal and vertical axes of symmetry corresponding to boundaries of said decoded blocks, thereby producing in series N pixel segments of each translated block, each of said pixel segments being formed with two collinear half-segments in two respective adjacent decoded blocks separated by a boundary;

(b) first evaluating means for successively evaluating, for each half-segment in said each of said pixel segments, a discontinuity divergence equal to an absolute value of a difference between a brightness level of a pixel of said each half-segment bordering on said boundary and an arithmetical average of brightness levels of two pixels adjacent to said bordering pixel and respectively included in said each half segment and a corresponding half-segment which borders on said boundary and is collinear with said each half-segment;

(c) first determining means for determining, for said each half segment, a discontinuity correction factor and a sign of said discontinuity divergence as a function of said discontinuity divergence and a quantization pitch used in said coding and decoding by transformation of the decoded block to which said half-segment belongs;

(d) first correcting means for correcting said brightness levels of said pixels in said each half-segment and corresponding collinear half-segment as a function of discontinuity correction factor and sign, thereby deriving first corrected brightness levels of said pixels in said each of said pixel segments and (e) second evaluating means for successively evaluating, for said each of the pixel segments, a block divergence equal to a difference between two dummy brightness levels evaluated for said each half-segment and said corresponding collinear half segment, respectively, a dummy brightness level for each said half-segment being evaluated as a sum and a difference of the corrected brightness level of said bordering pixel and of a half-difference of said corrected brightness level and a brightness level of the pixel included in said corresponding collinear half-segment and bordering on said boundary when said corrected brightness level of said bordering pixel is less and more than said brightness level of said pixel included in said corresponding collinear half-segment, respectively;

(f) second determining means for determining a block correction factor and a sign of said block divergence as a function of said block divergence and said quantization pitch; and (g) second correcting means for correcting brightness levels of pixels of said each half segment and said corresponding collinear half segment by adding and subtracting from said pixel brightness levels, respectively said block correction factor weighted by decreasing coefficients, in proportion to distances between said pixels and said boundary respectively when said dummy brightness level relating to said each half-segment is more and less than said dummy brightness level relating to said corresponding collinear half-segment.

6. The filtering device as claimed in claim 5, wherein said first and second determining means are merged, and further including:

(h) first multiplexing means for multiplexing said discontinuity divergences and block divergences into multiplexed divergences applied to said merged determining means which transmit multiplexed discontinuity and block correction factors to said first and second correcting means.

7. A filtering device as claimed in claim 5, wherein said first evaluating, determining and correcting means define a first means set in relation with first segments constituted by the lines and columns, respectively, in said translated blocks, and further wherein second evaluating, determining and correcting means define a second means set analogous to said first means set and relating to second segments constituted by columns in said translated blocks, and lines, respectively, said second means set operating subsequent to said first means set.

8. The device as claimed in claim 7, wherein said first and second divergence evaluating means are merged, and said first and second means for determining correction factors are merged, and further including:

(h) first transposing means for transposing each block of first corrected segments coming from said first means set into transposed blocks (i) second multiplexing means for multiplexing said translated blocks and said transposed blocks into multiplexed blocks applied to said second means set; and (j) second transposing means for transposing the corrected blocks produced by said second means set.

* * * * *